Aug. 6, 1935.  W. W. EITEL  2,010,145
METAL-TO-GLASS SEAL
Filed Dec. 9, 1932
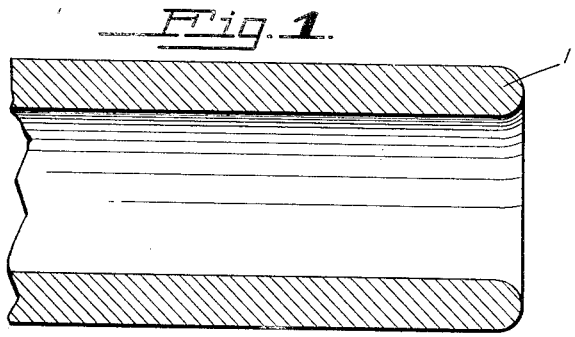
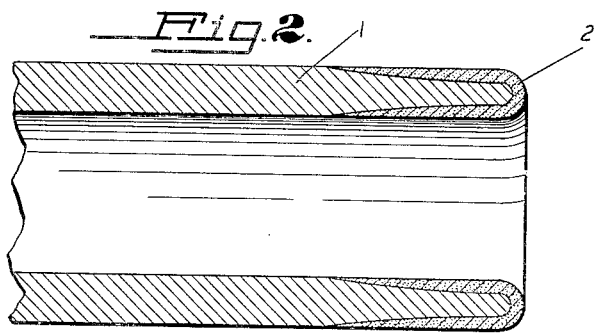
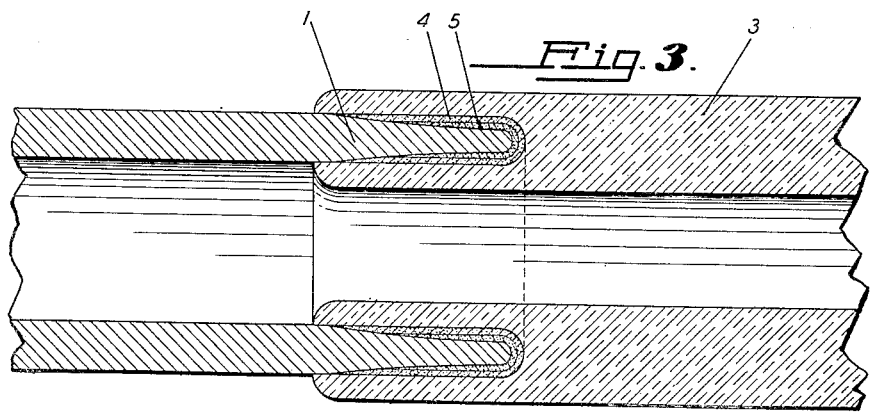
INVENTOR,
WILLIAM W. EITEL.
BY Donald K. Lippincott
ATTORNEY Patented Aug. 6, 1935

2,010,145

UNITED STATES PATENT OFFICE 2,010,145

METAL-TO-GLASS SEAL

William W. Eitel, San Bruno, Calif., assignor to Heintz & Kaufman Ltd., San Francisco, Calif., a corporation of Nevada Application December 9, 1932, Serial No. 646,470

7 Claims. (Cl. 49—81)

My invention relates to a metal-to-glass seal and more particularly to structures comprising glass and metal elements hermetically sealed together, and to methods relating to the formation of such a combination.

Among the objects of my invention are: To provide a metal-to-glass joint which will not crack or leak when used for evacuated containers; to provide a method of sealing a metal tube to a glass tube of differing expansion characteristics; to provide a nickel to glass seal which will be hermetically tight under varying temperatures; and to provide a method of sealing a nickel tube to a glass tube.

Other objects of my invention will be apparent or will be specifically pointed out in the description forming a part of this specification, but I do not limit myself to the embodiment of my invention herein described, as various forms may be adopted within the scope of the claims.

While I am aware of the fact that a number of methods have been used to seal copper to glass to form an airtight seal adapted for use in evacuated vessels such as water-cooled vacuum tubes, for example, I have found it advantageous to use nickel rather than copper, first because of its higher melting point, and second because nickel has no tendency to scale or progressively oxidize when heated.

In a high power vacuum tube for example, where the anode is formed from a copper cylinder joined to a glass envelope by a copper-to-glass seal, the copper anode must be water cooled, as the copper will scale and be destroyed at high temperature. A nickel tube will not scale and therefore may be air-cooled, thus dispensing with circulating systems and their attendant insulation problems.

A dependable nickel-to-glass seal however cannot be made by the methods usually adopted for copper-to-glass seals. In copper seals, the end of the copper tube terminates in a sharpened edge which sticks to the glass and which gives or responds to the strains set up by the differential expansion of the glass and the copper.

Broadly speaking, my invention comprises a metal-to-glass seal in which the glass does not wet the metal. The metal is provided with a deep, coherent oxide coating and the glass is sealed to this coating, the depth of coating being sufficient that only a portion of the oxide can be dissolved in the molten glass, thus leaving a layer of oxide between the glass and metal. It is preferable, when sealing a metal tube to a glass tube, to taper the depth of the oxide coating, making the coating progressively thicker toward the terminus of the metal tube.

Referring to the drawing, illustrating a preferred embodiment of the invention:

Figure 1 is a sectional view of the end of a metal tube.

Figure 2 is a sectional view of a metal tube having a deep oxide coating formed on the end thereof.

Figure 3 is a sectional view of the completed joint.

A metal tube 1, preferably of nickel or other metal, giving a tough adherent oxide coating, is provided with a layer, preferably tapered, of oxide 2. This layer may be formed by differentially heating the end of the tube in an oxidizing flame to a white heat for a sustained length of time until a coating of oxide is formed to a substantial depth, at least to a depth greater than can be dissolved in molten glass when such glass is applied to the layer.

After the coating has been formed, a glass tube 3 is heated until it softens and applied to the white hot end of the nickel tube. I prefer to insert the oxidized portion into the glass as shown, so that there may be glass both on the inside as well as the outside of the metal tube.

The joint is well heated and worked in the flame, care being taken not to reduce any portion of the oxide during the welding process. If the oxide coating has been properly made, a portion 4 of the oxide will dissolve in the glass, while the remainder 5 will not be dissolved, but will form a barrier between the glass and the metal. In this manner an airtight seal is made. The glass is not in reality sealed to the metal, but to the oxide, which in turn is closely adherent to the metal.

The presence of the oxide layer, and the dissolved oxide layer appears to form a sort of graded seal between the metal and the glass. At least, the undissolved oxide forms a cushion between the glass and the metal, and effectively allows for the difference of expansion between the glass and the metal, and prevents the joint from cracking.

In-as-much as the welding of the glass and the metal takes places at an extremely high temperature, no gas is involved at the joint and the weld is smooth and free from bubbles. If the joint were made using a sharpened edge, particularly when nickel is utilized for the tube material, the temperature of the flame necessary to make a gas-free joint is so high that the knife edge will burn off before the joint can be made.

Such a joint as I have described can be worked at the extreme temperatures close to the melting point of the metal, without damage to the tubes and with great advantage in obtaining a gas-free seal.

In previous seals, metal-to-glass seals, great stress is laid on the fact that little or no oxide should be formed, and that the glass shall thoroughly wet the metal. In order that the glass wet the metal all of the oxide formed, if any, must be dissolved in the glass. This limitation on the amount of oxide limits the time and heat used in making the seal, to avoid the formation of oxide.

As the process here described has for its main object the formation of a heavy deep layer of oxide, there are no limitations in time, and the heat applied may be the maximum endured by the material.

The seal above described is highly satisfactory for use in evacuated vessels, and is particularly adapted for use in vacuum tubes of high power to join an anode to the glass envelope. If nickel is used as the metal, the anode may be air-cooled, dispensing with the usual water circulation.

While nickel has been specified as the preferred metal, other materials may be used. Nickel iron and nickel chromium alloys are in general satisfactory and if care be used in forming the oxide layer to obtain a deep coherent layer, a proper seal may be made to the various steels. The process is applicable to any of the metals on which a dense coherent coating of the proper thickness can be formed, and seals have been made in the manner described, uniting glass to copper, the copper however requiring special treatment to form a dense deep oxide, rather than the usual loose scale. When the oxide is of proper depth and coherence, the glass will not wet the metal and there is no need to sharpen the edges as has been necessary heretofore.

I claim:

1. The method of uniting a glass tube and a nickel tube, which comprises deeply oxidizing the metal tube at one end, tapering the oxide coating to a thin layer at a distance away from said end, and welding one end portion of the glass tube to the tapered oxide layer.

2. The method of uniting a glass tube and a nickel tube, which comprises deeply oxidizing the metal tube at one end, tapering the oxide coating to a thin layer at a distance away from said end, and welding one end portion of the glass tube to the tapered oxide layer, said weld extending from the thickest to the thinnest portions of the oxide.

3. In combination a nickel tube having an end portion oxidized to form a layer of tapering thickness, said layer having its greatest thickness at the terminus of said tube, and a glass tube welded to said end portion.

4. In combination a nickel tube having an end portion differentially oxidized from a thin layer at a distance away from the terminus to a thick portion at the terminus, and a glass tube welded to said end portion, said weld contacting said differentially oxidized layer.

5. In combination a nickel tube having an end portion differentially oxidized from a thin layer at a distance away from the terminus to a thick portion at the terminus, and a glass tube welded to said end portion, said weld contacting substantially all of said differentially oxidized layer.

6. The method of uniting a glass sheet to an edge of a nickel sheet, which comprises deeply oxidizing said edge, tapering the oxide coating to a thin layer at a distance away from said edge, and welding an edge of said glass sheet to the tapered oxide layer.

7. In combination, a nickel sheet having a portion differentially oxidized from a thin layer at a distance away from an edge tapering to a thick layer at the edge, and a glass sheet welded to said nickel sheet, the weld contacting said differentially oxidized portion.

WILLIAM W. EITEL.